United States Patent
Paquin et al.

(10) Patent No.: US 8,882,125 B2
(45) Date of Patent: Nov. 11, 2014

(54) BICYCLE ASSEMBLY WITH BOTTOM BRACKET SHELL

(75) Inventors: Bradley L. Paquin, Santa Cruz, CA (US); Jean-Luc Callahan, San Jose, CA (US); Robb Jankura, Morgan Hill, CA (US); Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 274 days.

(21) Appl. No.: 13/316,399

(22) Filed: Dec. 9, 2011

(65) Prior Publication Data
US 2013/0147152 A1    Jun. 13, 2013

(51) Int. Cl.
*B62K 19/34*    (2006.01)
*F16C 33/58*    (2006.01)

(52) U.S. Cl.
CPC ............. *F16C 33/581* (2013.01); *F16C 33/588* (2013.01); *B62K 19/34* (2013.01)
USPC .......................... 280/281.1; 384/569; 384/570

(58) Field of Classification Search
CPC ........ B62K 19/34; B62K 19/30; B62K 19/16; B62K 19/00; B62K 3/02; F16C 33/64; F16C 33/62; F16C 33/60; F16C 33/588; F16C 33/583; F16C 33/581; F16C 33/58
USPC ............... 280/281.1; 384/569, 570, 577, 560, 384/561, 564, 502, 499
See application file for complete search history.

(56) References Cited

U.S. PATENT DOCUMENTS

| | | | | | |
|---|---|---|---|---|---|
| 4,545,691 | A | * | 10/1985 | Kastan et al. | 384/458 |
| 4,850,607 | A | * | 7/1989 | Trimble | 280/281.1 |
| 4,900,048 | A | * | 2/1990 | Derujinsky | 280/281.1 |
| 5,273,303 | A | * | 12/1993 | Hornzee-Jones | 280/288.3 |
| 5,368,804 | A | * | 11/1994 | Hwang et al. | 264/258 |
| 6,443,033 | B1 | * | 9/2002 | Brummer et al. | 74/594.1 |
| 6,543,308 | B2 | | 4/2003 | Harrington | |
| 7,762,571 | B2 | | 7/2010 | Dodman et al. | |
| 8,066,295 | B1 | * | 11/2011 | Cusack et al. | 280/281.1 |
| 2009/0289435 | A1 | * | 11/2009 | Wu et al. | 280/281.1 |
| 2011/0193314 | A1 | | 8/2011 | Guichard et al. | |
| 2012/0098233 | A1 | * | 4/2012 | Groendal | 280/283 |

FOREIGN PATENT DOCUMENTS

| | | | |
|---|---|---|---|
| DE | 3034116 A | * | 3/1982 |
| FR | 2796425 A1 | * | 1/2001 |

* cited by examiner

*Primary Examiner* — Joseph M Rocca
*Assistant Examiner* — Daniel Yeagley
(74) *Attorney, Agent, or Firm* — Knobbe Martens Olson & Bear LLP

(57) ABSTRACT

A bicycle assembly can include a main frame having a bottom bracket shell to receive a bottom bracket. The bottom bracket shell can be made of carbon fiber with one or more metal rings to serve as bearing surfaces within the bottom bracket shell. The metal rings may also be split metal rings with a gap between two spaced apart ends.

23 Claims, 7 Drawing Sheets

BICYCLE ASSEMBLY WITH BOTTOM BRACKET SHELL

CROSS-REFERENCE TO RELATED APPLICATIONS

N/A

BACKGROUND OF THE INVENTION

1. Field of the Invention

The present invention relates generally to bicycle systems and frame assemblies. In particular, the present invention relates to a frame assembly for receiving a bottom bracket.

2. Description of the Related Art

A bicycle crankset is part of a bicycle drivetrain that converts the reciprocating motion of the rider's legs into rotational motion used to drive the rear wheel. It may include one or more chainrings attached to the pedal crank to which the pedals attach. The rider acts on the pedals to create the rotational motion. A bottom bracket connects the crankset to the bicycle and allows the crankset to rotate freely. The bottom bracket can include a spindle attached to the crankset, and bearings that allow the spindle and pedal cranks to rotate. The chainrings and pedals attach to the pedal cranks. The bottom bracket fits inside the bottom bracket shell, which may connect parts of the bicycle frame such as the seat tube, down tube and/or chain stays.

SUMMARY OF THE INVENTION

There is a continual need for improvement in bicycle frames, bottom brackets, and other assemblies related thereto. Accordingly, in some embodiments, a bottom bracket outer shell is configured to allow the use of a carbon fiber bicycle frame that receives a metal bottom bracket.

In some embodiments, a bicycle assembly can comprise a frame. The frame can comprise a top tube having a first end and a second end, a down tube having a first end and a second end, a head tube connected to the first end of the top tube and first end of the down tube, and a carbon fiber bottom bracket shell for receiving a bottom bracket. The carbon fiber bottom bracket shell can be connected to the second end of the down tube. The bottom bracket shell can have a top region and a bottom region. A first metal split ring can be positioned within the carbon fiber bottom bracket shell. A second metal split ring can be positioned within the carbon fiber bottom bracket shell and spaced from the first metal split ring. Each of the first and second metal split rings can have a discontinuous region with two ends which effectively face each other but do not connect.

According to some embodiments, the discontinuous regions can be positioned within the top ⅓ of the carbon fiber bottom bracket shell and/or are substantially aligned. The first and second split metal rings can be integrally formed with the carbon fiber bottom bracket shell.

A bicycle frame can comprise a top tube, a down tube, a head tube connecting the top tube and the down tube at front ends of both the top tube and the down tube, and a bottom bracket shell. The bottom bracket shell can have an interior cavity with a top region and a bottom region, the bottom bracket shell connected to a back end of the down tube. The bottom bracket shell can comprise carbon fiber and a pair of metal rings positioned within and integrally formed with the carbon fiber to form the bottom bracket shell such that each of the rings defines a portion of an interior surface of the bottom bracket shell.

In some embodiments, each of the pair of metal rings can have two unconnected ends spaced apart by a gap passing completely through the ring. Each of the metal rings can be positioned within the interior cavity of the bottom bracket shell such that the gaps are located in the top region. There may also be a bearing locating feature. The bearing locating feature can comprise at least one of a cir-clip groove, a shoulder, a protrusion, a shelf, and a non-constant diameter of the bottom bracket shell.

A bicycle frame can comprise a top tube having a first end and a second end, a down tube having a first end and a second end, a head tube connected to the first end of the top tube and first end of the down tube, and a bottom bracket shell having an interior cavity for receiving a bottom bracket. The bottom bracket shell connected to the second end of the down tube and comprising carbon fiber and at least one metal split ring positioned within and integrally formed with the carbon fiber. The at least one metal split ring can have a discontinuous region with two ends which effectively face each other but do not connect.

According to some embodiments, the discontinuous region can be positioned within a top ⅓ of the bottom bracket shell. The at least one metal split ring may comprise two metal split rings, each positioned within and integrally formed with the carbon fiber, the two metal split rings spaced from one another within the carbon fiber. The discontinuous regions of the two metal split rings can be substantially aligned.

A method of forming a bicycle frame according to some embodiments can comprise one or more of the following steps. Providing a mandrel. Placing at least one metal split ring on the mandrel, each of the at least one metal split ring having a gap between two spaced apart ends. Placing resin-impregnated filaments around the mandrel and the at least one metal split ring. Curing the combined resin-impregnated filaments and at least one metal split ring on the mandrel. Removing the mandrel.

The method according to further embodiments can include the step of placing at least one metal split ring on the mandrel comprising placing a pair of metal split rings at spaced apart locations on the mandrel. Also, positioning each of the metal split rings such that the gaps are substantially aligned and/or positioning each of the metal split rings such that the gaps are within 15 degrees of one another.

In the method according to further embodiments, placing resin-impregnated filaments around the mandrel and the at least one metal split ring can comprise winding resin-impregnated filaments around the mandrel and the at least one metal split ring so that the inner diameter of the at least one ring conforms to the outer diameter of the mandrel.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION OF THE PREFERRED EMBODIMENT

Figure 1:
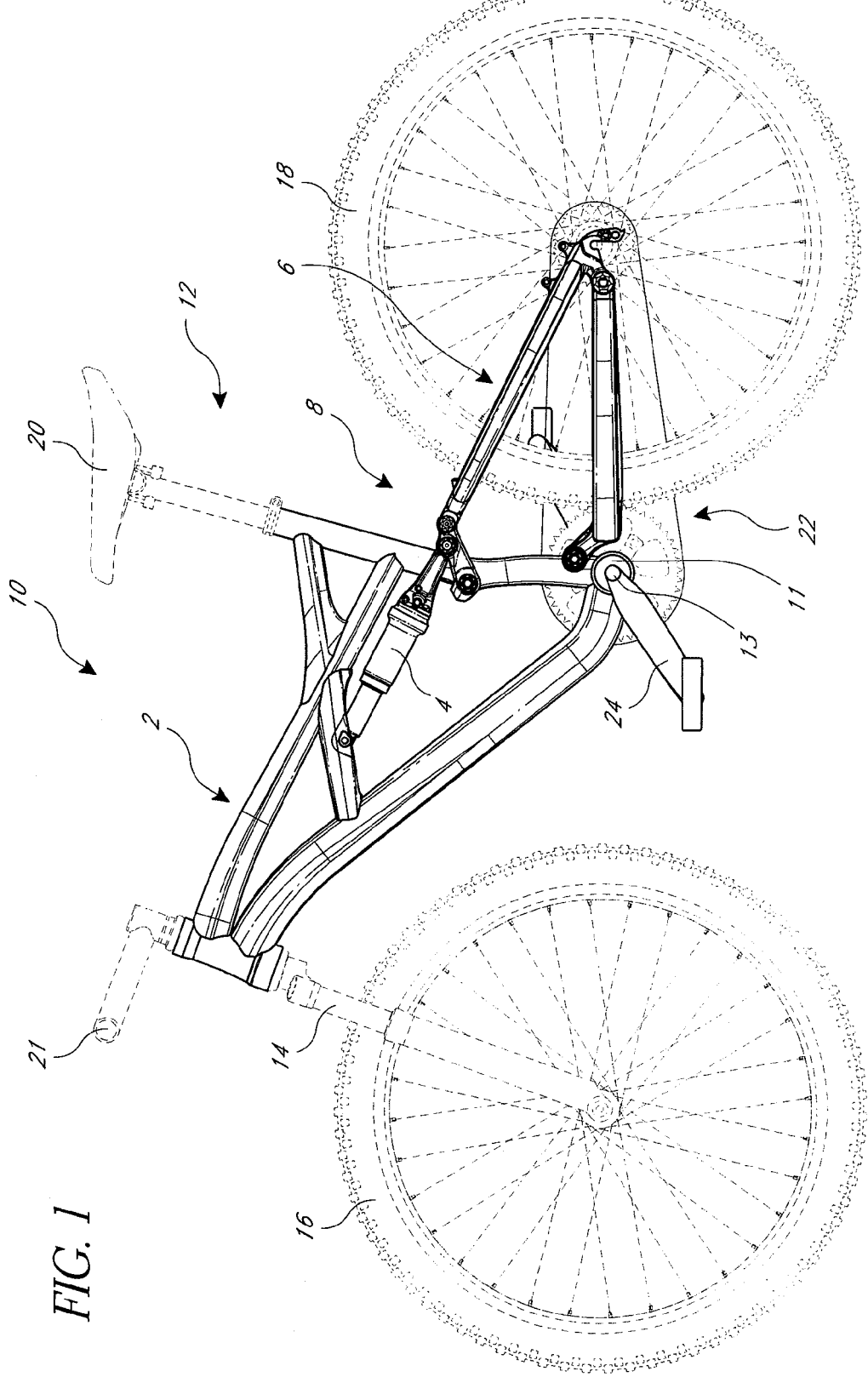
FIG. 1 is a side view of an embodiment of a bicycle.

The following description will be disclosed for illustrative purposes relative to a bicycle 10, as shown in FIG. 1, and more particularly, to an off-road bicycle or mountain bike. Those skilled in the art will appreciate that the embodiments as described herein may equally apply to other types of pedal driven vehicles such as road bikes, children's bikes, cruisers, recumbents, tricycles, quadracycles, unicycles, paddle boats, or other foot or hand driven vehicles.

To aid in the description of the bicycle 10, certain directional or relative terms may be used herein. The term "longitudinal" refers to a direction, length or a location between the front and rear of the bicycle 10. The term "lateral" refers to a direction, length or location between the sides of the bicycle 10. Heights may be described as relative distances from a surface upon which the bicycle 10 is operated in a normal manner. Thus, the terms "above" or "below" generally apply to the bicycle as assembled, and being oriented as it would be normally ridden, or as it is depicted in any of the relevant figures. Front, rear, left, and right directions generally refer to those directions from the perspective of a rider normally seated on the bicycle 10.

With reference to FIG. 1, the bicycle 10 includes a frame assembly 12, a fork 14, a front wheel 16 and rear wheel 18. The frame assembly 12 supports a seat assembly 20 at a location spaced rearward from a handlebar assembly 21. The handlebar assembly 21 is rotatably supported by the frame assembly 12 and is coupled to the fork 14 and the front wheel 16 such that side to side movement of the handlebar 21 results in similar movement of the fork 14 and the front wheel 16.

The frame assembly 12 also supports the rear wheel 18. A drivetrain is configured to allow a rider of the bike 10 to supply power to one or both of the wheels 16, 18. In the illustrated arrangement, the drivetrain includes pedal cranks 24 that are coupled to the rear wheel 18 by a multispeed chain drive transmission 22. The multispeed chain drive transmission 22 may include one or more gears, or chainrings, coupled to the pedal crank 24 and one or more gears, or sprockets, coupled to the rear wheel 18. The chainrings and sprockets are coupled by an endless drive chain that is capable of transmitting torque from the pedal crank 24 to the rear wheel 18. One or more shifting mechanisms, such as a derailleur, may be provided to shift the chain between the chainrings or sprockets. The shifting mechanism may be controlled by rider controls mounted on the handlebar assembly 21.

The bike 10 may also include front and rear brake assemblies associated with the front and rear wheels 16, 18 respectively. The brake assemblies may be controllable by a rider of the bike 10, typically via hand controls provided on the handlebar 21. The brake assemblies can be disc brakes, rim brakes, or other suitable types of brakes assemblies.

The frame assembly 12 can have one of many different configurations. For example, the frame assembly can have a main frame 2 and a subframe 6. The main frame 2 and the subframe 6 can be rigidly connected or configured for relative movement, such as with a rear suspension assembly 8, including a shock absorber 4. Because of their typical shapes, the main frame 2 is often referred to as the front triangle and the subframe 6 is often referred to as the rear triangle. Other shapes and configurations for the frame assembly 12 can also be used.

Figure 2:
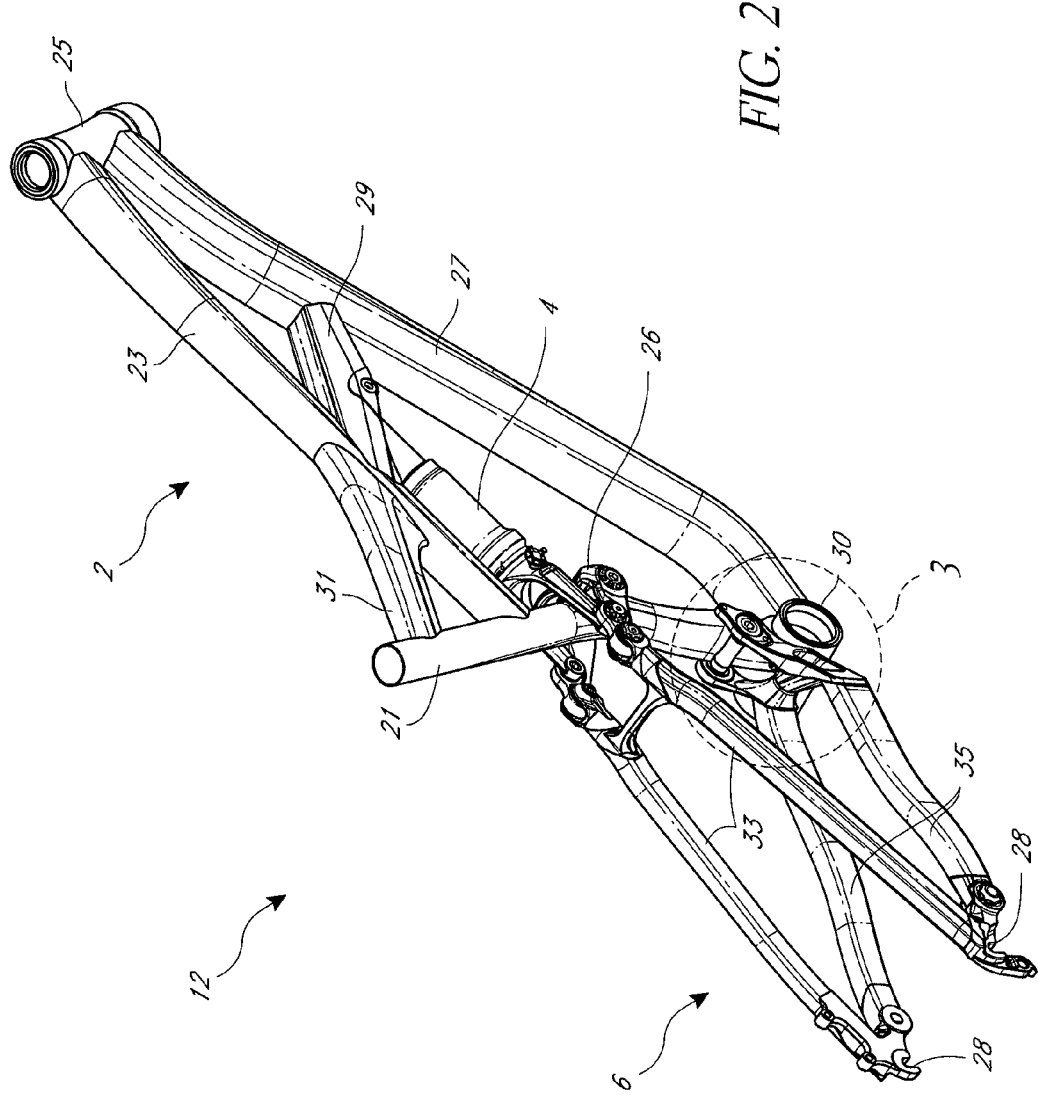
FIG. 2 illustrates a perspective view of an embodiment of a bicycle frame.

FIG. 2 illustrates a configuration of bicycle frame assembly 12 with a rear suspension system. The bicycle frame assembly 12 has a main frame 2, a shock 4 and a subframe 6. As can be seen, the main frame 2 can be a triangular main frame. A main frame 2 according to some embodiments comprises a seat tube 21, a top tube 23 and a head tube 25. The top tube 23 can connect the seat tube 21 and the head tube 25. A seat post with an attached saddle 20 (shown in FIG. 1) can be installed in the seat tube 21. A steering post or column which connects the handle bars and the fork 14 (shown in FIG. 1) can be installed in the head tube 25. Some embodiments may further include a down tube 27 and a bottom bracket shell 30. The down tube 27 can connect the bottom bracket shell 30 and the head tube 25. A bottom bracket 11 (shown in FIG. 1) can be installed into the bottom bracket shell 30 to which pedal cranks 24 and pedals can be attached (shown in FIG. 1).

According to some embodiments, the main frame 2 can further include one or more gussets or cross tubes 31, 29. The cross tubes can connect various parts of the main frame 2. For example, in FIG. 2, the cross tube 31 connects the seat tube 21 and the top tube 23 and the cross tube 29 connects the top tube 23 and the down tube 27. The cross tube 29 can connect the top tube 23 and the down tube 27 at a location spaced away from the ends of the top tube 23 and the down tube 27. The cross tubes 31, 29 can increase the frame's stability and allow for additional design features, such as a downward sloping top tube 23. In other embodiments, a single cross tube includes both cross tubes 31 and 29 combined into one piece and the main frame 2 is without the use of a top tube 23. In other embodiments, a top tube is used but only one cross tube 31 or 29 is present.

The subframe 6 of the frame assembly 12 can include a pair of seat stays 33 and a pair of chain stays 35. Each seat stay 33 can connect with a corresponding chain stay 35 at or near a dropout 28. This connection can be fixed or pinned to allow for rotation. In some embodiments, the chain stays 35 are hingedly connected to the main frame at or near the bottom bracket shell 30.

A shock absorber 4 can be pivotally connected to the main frame 2 at one end and to the subframe 6 at the other end. The shock absorber 4 can be used to control the amount of movement between the main frame 2 and the subframe 6 and the rate of change in their relationships. In some embodiments, the frame assembly 12 can also comprise a linkage 26. The linkage 26 is shown connecting the main frame 2, the shock absorber 4 and the subframe 6. In this way the linkage 26 can be used together with the shock absorber 4 to control the range of movement and the relationships between the main frame 2 and the subframe 6. In some embodiments, the shock 4 can connect directly to the subframe 6, with or without the use of a linkage 26. Also, as shown, the shock 4, the main frame 2 and the subframe 6 all attach to the linkage at different locations. In some embodiments, some of these connections are combined at one location.

Figure 3:
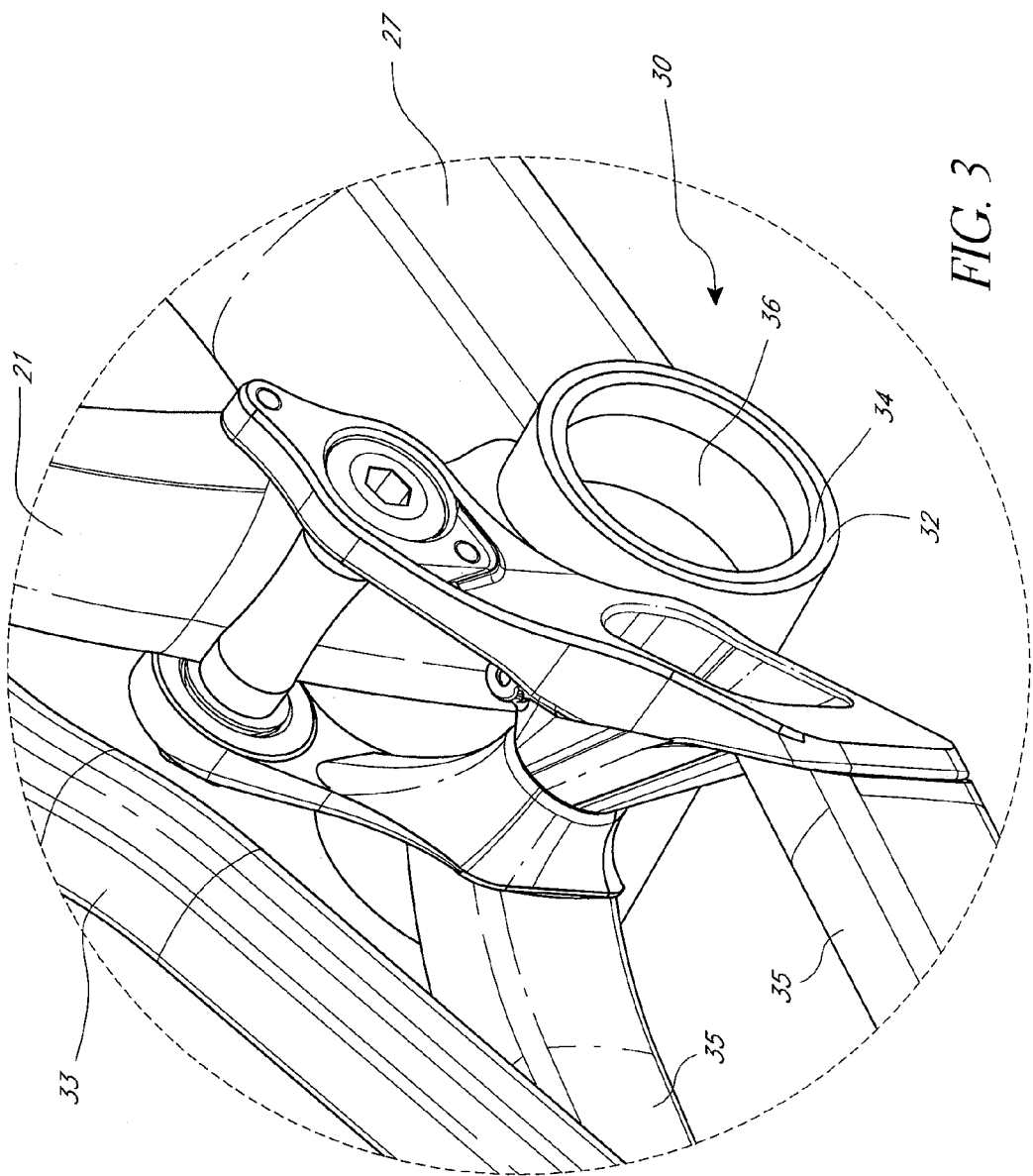
FIG. 3 is a detail view of the bicycle frame of FIG. 2.
Figure 4:
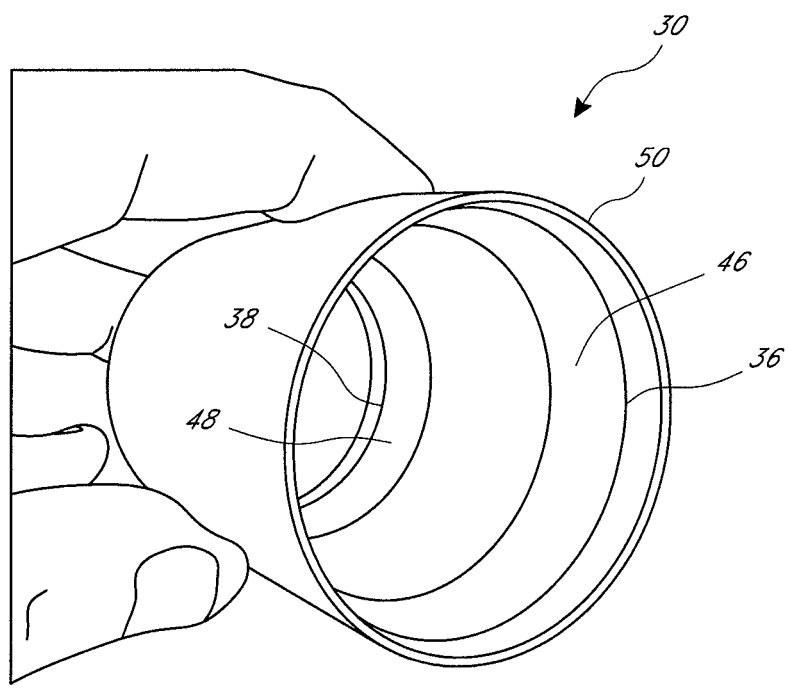
FIG. 4 shows a side view of a bottom bracket shell.

Turning now to FIG. 3, a detail view of the frame assembly 12 is shown. The frame assembly 12 has a bottom bracket shell 30 that typically connects the down tube 27 and the seat tube 21. The bottom bracket shell 30 can be a one piece or a two piece shell. As illustrated, the bottom bracket shell 30 is a two piece shell with an outer shell 32 and an inner shell 34.

Whether the bottom bracket shell 30 is a one piece or a two piece shell may depend on various factors including the method of manufacturing and the type of frame construction. The frame assembly 12 can be made of carbon-fiber-reinforced polymer (carbon fiber) or other synthetic and/or composite materials. Carbon fiber frame assemblies can be made in many different ways.

For example, cylindrical tubes can be joined with adhesives and lugs, in a method somewhat analogous to a lugged steel frame. This type of construction could use a one piece bottom bracket shell 30 that attaches to a seat tube 21 and/or a down tube 27 with the lugs mentioned above.

As another example, carbon fiber frame assemblies can be manufactured in a single piece, called monocoque construction, or similarly in discrete pieces or sections. This may require the use of internal bladders during the forming process that are later removed as is known in the art. The use of internal bladders generally requires access points into the tube, frame, or section of the frame. One access point that may be used is the bottom bracket shell 30. A two piece bottom bracket shell can allow all or part of the main frame to be formed first with the outer shell 32 that allows for an internal bladder access point at the bottom bracket outer shell 32 and then the inner shell 34 can be later placed into the outer shell 32 to then be cured and secured together.

Looking now to FIGS. 4-7, a bottom bracket shell 30 is shown. It should be understood that the illustrated bottom bracket shell 30 can be a single piece bottom bracket shell or the inner piece of a two piece bottom bracket shell as discussed above.

The bottom bracket shell 30 can include a carbon fiber cylindrical body 44 with one or more metal rings 36, 38 that are positioned within and integrally molded with the cylindrical body 44. The one or more metal rings 36, 38 can provide a bearing surface 46, 48, such as a bearing seat that can provide increased durability within a carbon fiber bottom bracket shell. As shown, two metal rings 36, 38 can be within the bottom bracket shell 30 that are spaced away from one another. Desirably, the metal rings are configured and positioned to provide an even and balanced interface and bearing surface within the bottom bracket shell 30. A single metal ring can also be used. A single metal ring can extend through most or part of the length of the bottom bracket shell 30. For example, in comparison to FIG. 7, a single metal ring could extend the length of the two metal rings 36, 38 and the space between them. In some embodiments, the single metal ring can extend the entire length of the bottom bracket shell 30 and in some embodiments the two rings can be spaced to be at the ends of the bottom bracket shell 30.

In some embodiments, there is a small space between the end of the bottom bracket shell 30 and the side of the metal ring, or the side of the two metal rings (FIGS. 4-7). For example, the single or two metal rings can be spaced with a 1 to 2 mm space between a side of the metal ring and an end of the bottom bracket shell 30. In some embodiments, the space can be equal to the wall thickness of the seat tube or down tube. In other embodiments, the space can be larger or smaller than this wall thickness.

A bottom bracket 11 (shown in FIG. 1) having bearings which support a spindle 13 can be placed in direct contact with the one or more metal rings 36, 38. A cartridge bottom bracket 11 can also be placed within the carbon fiber cylindrical body 44 contacting the one or more metal rings 36, 38. The one or more metal rings can be made of a metal alloy such as an aluminum alloy or a titanium alloy. The use of aluminum, titanium, and/or certain other materials can allow for a lightweight yet strong and durable bearing surface.

In one example, a bottom bracket shell can have a length ranging from 50 to 100 mm. The length can depend on many features, for example a road bike may have a bottom bracket shell length between about 50 to 70 mm or between about 61.5 to 68 mm while a mountain bike may have a bottom bracket shell length between about 65 to 90 mm or between about 73 to 80 mm. In some embodiments, plastic cups can also be used with the bottom bracket 11. This bottom bracket system with plastic cups may utilize a bottom bracket shell that has a length on the smaller side of the ranges discussed above.

The size and position of the rings can be determined by the size and position of the bearings to be used. For example, a single metal ring could extend the entire length of the bottom bracket shell with a length between 50 mm to 100 mm. Alternatively, the single metal ring could be spaced away from the ends of the bottom bracket shell, for example 1 to 4 mm away. With two or more metal rings, each could have a length extending between the sides from between 4 to 10 mm, and for example, 7 mm. The two or more metal rings could have a length that is the same as, slightly larger or slightly smaller than the size of bearings to be used. The two or more metal rings may or may not be positioned to be equally spaced from the center of the bottom bracket shell or may or may not be symmetrically positioned within the bottom bracket shell.

In some embodiments, the bottom bracket shell and one or more metal rings can have an inner diameter of between about 40 to 70 mm or between about 46 to 60 mm. The size of the inner diameter can be dependent on many features such as, whether the bearings are directly pressed into the bottom bracket shell (for example 40 mm), and whether plastic cups are to be used (for example 56 mm). In addition, the bottom bracket shell may include two or more sections having differing cross sections and/or inner diameter. For example, FIG. 7B illustrates a bottom bracket shell 30" where the ends have two different inner and outer diameters and there is a section having a varying diameter between the two ends. Thus, the ring 36" is smaller than the ring 38". Other configurations may also be used such as one or more steps to increase the diameter. In addition, the inner or outer diameter could have different diameters while the other of the inner and outer diameter could remain constant.

The thickness of the bottom bracket shell may also be consistent or may vary. For example, the metal ring thickness can be between around 0.5 to 2 mm and the carbon thickness can be between around 0.5 to 2.0 mm. The thickness of the bottom bracket shell, in some embodiments is between 0.5 to 4 mm. In some embodiments, the thickness of the carbon can vary, while the thickness of the metal is constant, as illustrated in FIGS. 4-7.

The one or more rings can have an outer diameter of that is slightly smaller than the outer diameter of the bottom bracket shell. For example, the one or more rings can have an outer diameter of between about 39 to 71 mm or between about 46 mm to 60 mm. The carbon layer can then add between about 0.5 to 2.0 mm to determine the outer diameter of the bottom bracket shell. It should be understood that the dimensions discussed herein can vary greatly and may depend on such features as the bearing size and placement, among other features.

It is a common practice for current designs of carbon fiber frame assemblies with carbon fiber bottom bracket shells to include sacrificial plastic bearing cups. These plastic bearing cups generally hold a cartridge bottom bracket in place within the bottom bracket shell and are made to be easily replaceable. In this way, the plastic bearing cups experience all or most of the wear and tear and be replaced rather than allowing the wear and tear to damage the carbon fiber bottom bracket shell.

A metal ring within the bottom bracket shell can provide many benefits over the use of a plastic bearing cup and over direct contact with carbon fiber. For example, the metal surface has increased wear resistance, and it generally will not need to be replaceable, thus it eliminates the need for any sacrificial parts. At the same time, some embodiments may still include both one or more metal rings and one or more sacrificial parts, such as plastic cups.

Figure 5:
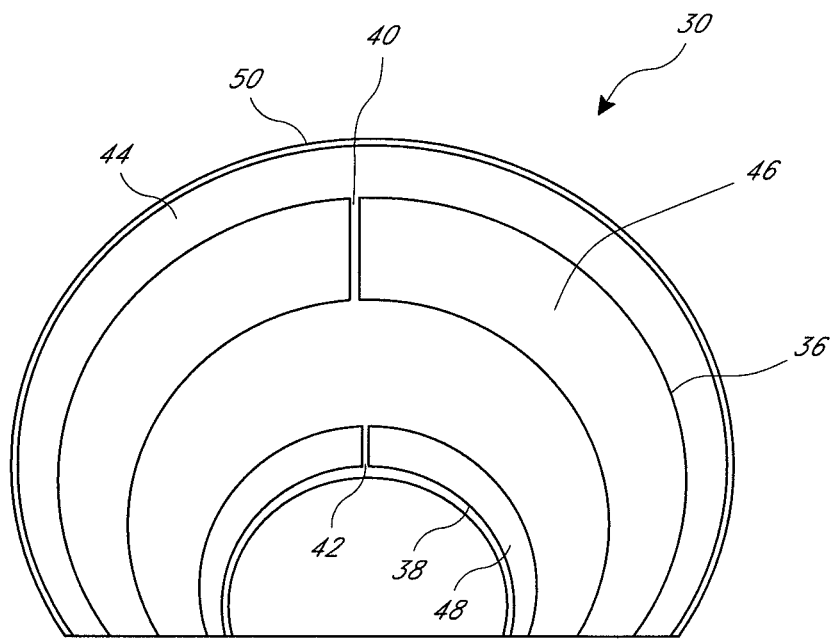
FIG. 5 is another view of the bottom bracket shell of FIG. 4.

In some embodiments, as can be seen with reference to FIG. 5, the one or more metal rings 36, 38 can be discontinuous or split rings with a gap 40, 42 between two ends of each ring. The metal rings can be formed initially as split rings, or they may be cut, split, or otherwise formed into a split ring. The metal ring in some embodiments can be a substantially continuous ring with a single interruption causing the ring as a whole to be discontinuous.

This gap 40, 42 can allow the ring 36, 38 to be formed without requiring tight tolerances in manufacturing. This is because when the ring is molded with the carbon fiber cylindrical body 44, the gap 40, 42 in the ring 36, 38 allows the ring to conform to the mandrel that it is cured on. Thus, the mandrel can have a controlled outer diameter to provide the needed tolerances. This is very beneficial as thousands of bottom bracket shells 30 can be made over time with one mandrel.

For example, mandrels can be used in connection with composite fabrication such as in filament winding. A pair of split metal rings can be placed on the mandrel. Resin-impregnated filaments can then be wound around the mandrel and split metal rings so that the inner diameter of the split metal rings conforms to the outer diameter of the mandrel. This creates a composite material structure, namely the bottom bracket shell 30. The resin-impregnated filaments can be carbon fiber filaments. The bottom bracket shell 30 is then cured and the mandrel is removed. The gap in the metal rings allows the rings 36, 38 to be placed onto the mandrel and conform to the shape of the mandrel, rather than requiring the initial diameter to be machined within a tight initial tolerance. It will be understood that the methods discussed herein could also involve the positioning of a single split metal ring, or more than two split metal rings.

Figure 6:
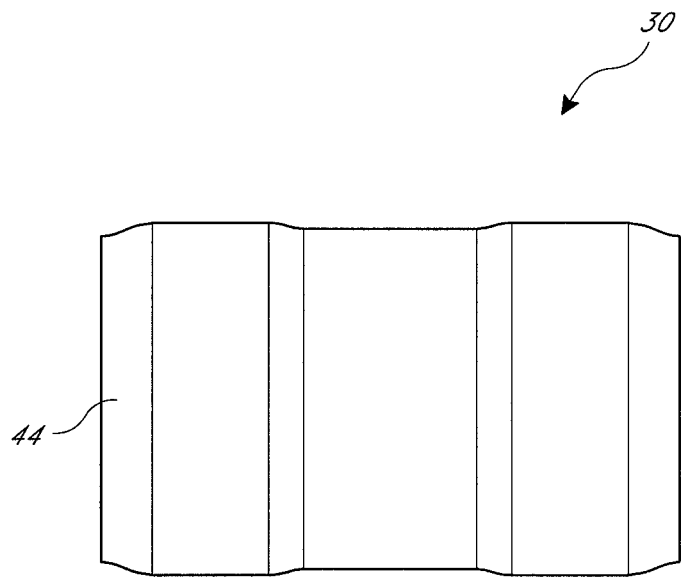
FIG. 6 is a schematic side view of a bottom bracket shell.
Figure 7:
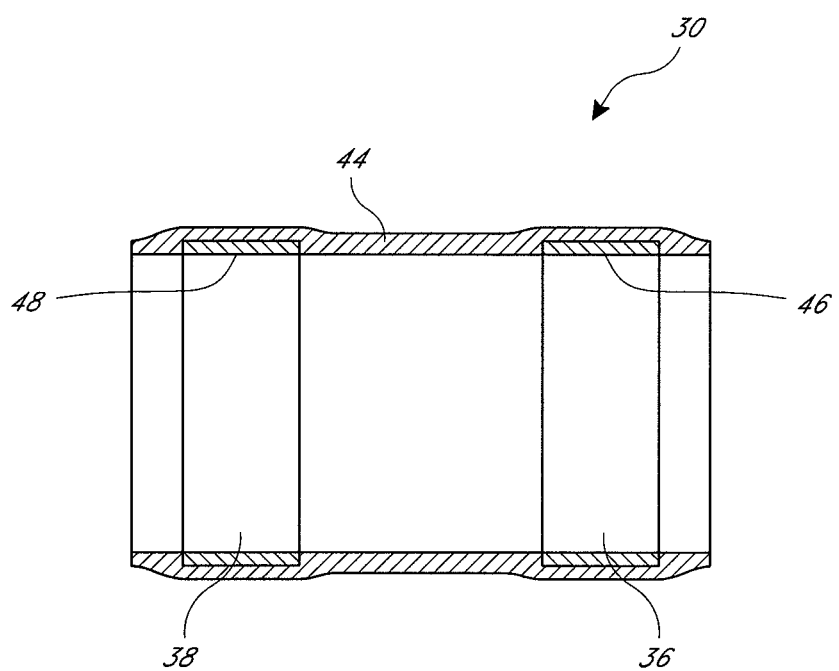
FIG. 7 is a cross-section of the schematic side view of the bottom bracket shell of FIG. 6.

The schematic drawings of FIGS. 6 and 7 show that layering carbon fiber over the metal rings may cause the bottom bracket shell 30 to be thicker at the metal rings, and/or to have a slightly undulating shape. Though shown with a variable outer diameter, the bottom bracket shell 30 may also have an outer diameter that is flat or generally flat.

Other methods of forming the bottom bracket shell 30 can also be employed. For example, rather than winding filaments around the mandrel and split rings, carbon fiber sheets can be placed around the mandrel which can then be placed within a mold to force the metal rings and carbon fiber sheets to achieve the desired shape around the mandrel.

Figure 8:
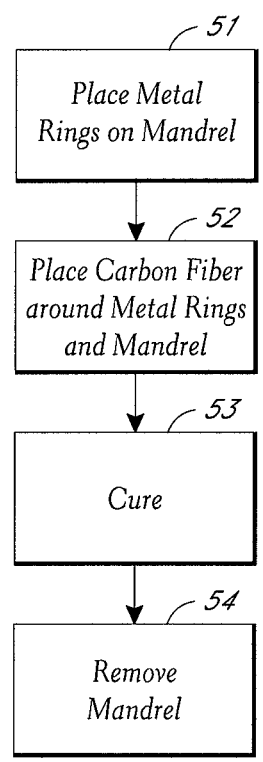
FIG. 8 is a flow chart illustrating some steps of a method of manufacturing a bottom bracket shell.

Another method of forming a bottom bracket shell 30 can include providing a mandrel and placing a pair of metal split rings on the mandrel, as in step S1 of FIG. 8. Then, resin-impregnated filaments can be placed around the mandrel and the pair of metal split rings, as in S2. The next step, S3 can be curing the combined resin-impregnated filaments and pair of metal split rings on the mandrel. Finally, S4 the mandrel can be removed. The method may also include placing the resin-impregnated filaments, the mandrel and the pair of metal split rings within a mold and heating during the curing step. The method may also include positioning the gaps in a particular region of the bottom bracket, aligning, and/or substantially aligning the gaps of the two split rings. For example, this may include positioning each of the metal split rings such that the gaps are substantially lined up in a similar position.

The bottom bracket shell 30 can then be bonded into a frame assembly or the above steps can be done in conjunction with co-molding the bottom bracket shell 30 with the rest of the frame assembly. For example, carbon fiber can be laid up around the mandrel at the same time as carbon fiber is laid up to form the down tube and/or the seat tube. The frame assembly can be heat cured within a mold to be joined together as one piece or substantially one piece. Other methods can also be used to form all or part of the frame assembly.

As mentioned above, the gaps 40, 42 in the split metal rings can be gaps positioned or lined up to achieve a desired configuration. In some embodiments, the each of the metal rings 36, 38 can be positioned within the bottom bracket shell such that the gaps 40, 42 are located in the top region 50 of the bottom bracket shell 30. The top region 50 can be the top half, the top third, or the top fourth of the bottom bracket shell 30. In some embodiments, the gaps can be located at or near the top most point of the bottom bracket shell 30. The gaps can be positioned within or around 45, 30, 25, 20, 15, 10, or 5 degrees of one another. The top of the bottom bracket shell 30 is generally an area where pedaling stress is at a minimum. Thus, positioning the gaps at the top or in the top region can beneficially reduce the stress on the carbon fiber cylindrical body 44.

The bottom bracket shell 30 can provide many benefits. The split in the metal ring can allow the ring to conform to the mandrel that it is cured on, helping with manufacturing tolerances. It will be noted that the inner diameter of the carbon fiber also does not need tight tolerances. For example, the carbon fiber positioned between the metal rings can be spaced outward from the inner surface of the metal rings. The gaps can be oriented at the top of the bottom bracket shell 30 where pedaling stress is at a minimum. The bottom bracket shell 30 can be a hybrid carbon and metal bottom bracket shell where current designs are either metal or carbon. The bottom bracket shell 30 has a manufacturing advantage of not needing tight tolerances due to the split design of the ring. The bottom bracket shell 30 provides the increased wear resistance of a metal bottom bracket shell with the weight advantage of a carbon fiber bottom bracket shell. The bottom bracket shell 30 desirably provides the ability to press a steel bearing into the shell without having to worry about wear and damage to the carbon fiber frame. No extra, sacrificial parts, such as plastic bearing cups may be needed.

Figure 7A:
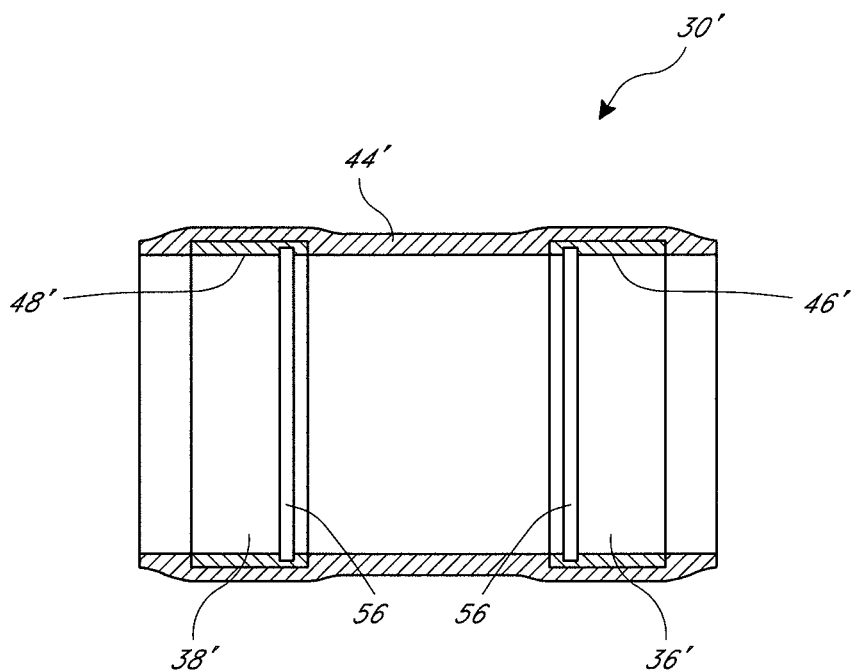
FIG. 7A is a cross-section of a schematic side view of another embodiment of bottom bracket shell.
Figure 7B:
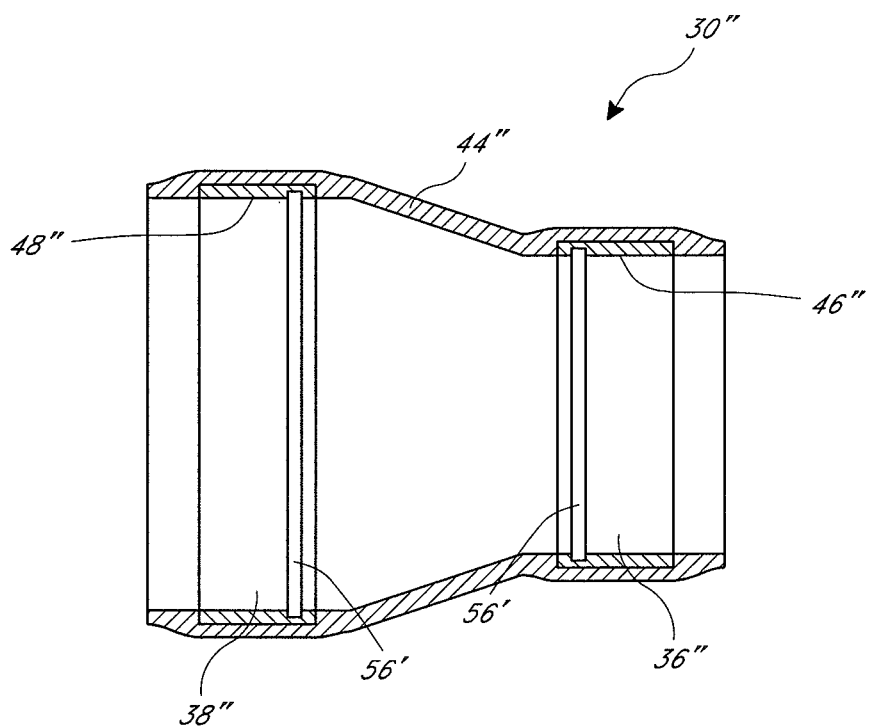
FIG. 7B is a cross-section of a schematic side view of still another embodiment of bottom bracket shell.

Looking now to FIG. 7A, another embodiment of a bottom bracket shell 30' is illustrated. Numerical reference to components is the same as previously described, except that a prime symbol (') has been added to the reference. Where such references occur, it is to be understood that the components are the same or substantially similar to previously-described components. It should be understood that the illustrated bottom bracket shell includes each of the features designated by the numbers used herein. However, as emphasized repeatedly herein, these features need not be present in all embodiments.

The bottom bracket shell can include one or more features to locate the bearing within the bottom bracket shell. For example, the one or more rings can include one or more bearing locating features 56 to locate the bearing position, such as a cir-clip groove, a shoulder, a protrusion, etc. FIG. 7A shows an example, with a cir-clip groove 56 in each of the metal rings 36', 38'. The cir-clip groove can correspond with a protrusion or shoulder on the bearing or bottom bracket assembly to properly position the bearings within the bottom bracket shell. In some embodiments, an edge of the one or more rings can provide the locating feature. For example, the ring can have an inner diameter of a size different from the adjacent carbon fiber to create a type of shelf. The bottom bracket can then have a corresponding feature which abuts the shelf to ensure the proper placement. It should be understood that the bottom bracket may be a sealed cartridge that uses one or more locating features, or bearing assemblies may be separately attached to the bottom bracket shell so that at least one locating feature can be used for each bearing assembly.

FIG. 7B illustrates another embodiment of a bottom bracket shell 30". This bottom bracket shell 30" has a non-constant cross section. The bottom bracket shell 30" has ends with different inner and outer diameters and there is a section having a varying diameter between the two ends. Thus, the ring 36" is smaller than the ring 38". A single metal ring, or more than two metal rings could also be used. It will also be understood, that though it cannot be seen, the metal rings of FIGS. 7A and 7B are split rings as discussed above.

The non-constant cross section of FIG. 7B can be used as a way to locate the bearing position within the bottom bracket shell 30". Other features, such as the cir-clip grooves 56' shown can also be used to locate the bearing position, but should be understood to be optional.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A bicycle assembly comprising:
   a frame comprising:
   a top tube having a first end and a second end;
   a down tube having a first end and a second end;
   a head tube connected to the first end of the top tube and first end of the down tube;
   a bottom bracket shell for receiving a bottom bracket, the bottom bracket shell connected to the second end of the down tube, the bottom bracket shell having a top region and a bottom region, comprising:
   carbon fiber;
   a first metal split ring positioned within and integrally formed with the carbon fiber; and
   a second metal split ring positioned within and integrally formed with the carbon fiber and spaced from the first metal split ring, wherein the bottom bracket shell comprises a first groove and a second groove and wherein the first metal split ring is at least partially embedded into the first groove and the second metal spilt ring is at least partially embedded into the second groove, such that inner surfaces of the first and second metal slit rings are substantially flush with an interior surface of the bottom bracket shell;
   each of the first and second metal split rings having a discontinuous region with two ends which effectively face each other but do not connect.

2. The bicycle assembly of claim 1, wherein the discontinuous regions are positioned within the top ⅓ of the bottom bracket shell.

3. The bicycle assembly of claim 2, wherein the discontinuous regions are substantially aligned.

4. The bicycle assembly of claim 1, further comprising a bottom bracket having bearings and a spindle positioned within the bottom bracket shell, the first and second metal split rings configured to serve as bearing races for the bearings.

5. The bicycle assembly of claim 1, further comprising a bottom bracket positioned within the bottom bracket shell and a crankset attached to the bottom bracket.

6. The bicycle assembly of claim 1, wherein the frame further comprises a main triangle with the head tube, top tube, down tube, and a seat tube connected to the down tube at the bottom bracket shell and the to the top tube.

7. The bicycle assembly of claim 1, further comprising a bearing locating feature.

8. The bicycle assembly of claim 7, wherein the bearing locating feature comprises at least one of a cir-clip groove, a shoulder, a protrusion, a shelf, a non-constant diameter of the bottom bracket shell and different sized split metal rings.

9. A bicycle assembly comprising:
   a frame comprising:
   a top tube;
   a down tube;
   a head tube connecting the top tube and the down tube at front ends of both the top tube and the down tube;
   a bottom bracket shell having an interior cavity with a top region and a bottom region, the bottom bracket shell connected to a back end of the down tube and comprising:
   carbon fiber defining a portion of an interior surface of the bottom bracket shell, a first groove and a second groove; and
   a pair of metal rings positioned within and integrally formed with the carbon fiber to form the bottom bracket shell such that each of the rings defines an additional portion of the interior surface of the bottom bracket shell;
   wherein one of the pair of metal rings is at least partially embedded into the first groove and the other of the pair of metal rings is at least partially embedded into the second groove, such that the portions of the interior surface of the bottom bracket shell defined by the pair of rings are substantially flush with the portion of the interior surface of the bottom bracket shell defined by the carbon fiber.

10. The bicycle assembly of claim 9, wherein each of the pair of metal rings has two unconnected ends spaced apart by a gap passing completely through the ring.

11. The bicycle assembly of claim 10, wherein each of the metal rings is positioned within the interior cavity of the bottom bracket shell such that the gaps are located in the top region.

12. The bicycle assembly of claim 9, further comprising a bottom bracket positioned within the bottom bracket shell wherein each of the metal rings surrounds the bottom bracket.

13. The bicycle assembly of claim 9, wherein the frame further comprises a seat tube connected to the bottom bracket shell and the down tube at one end and the top tube at another end.

14. The bicycle assembly of claim 9, further comprising a bearing locating feature.

15. The bicycle assembly of claim 14, wherein the bearing locating feature comprises at least one of a cir-clip groove, a shoulder, a protrusion, a shelf, and a non-constant diameter of the bottom bracket shell.

16. A bicycle assembly comprising:
a frame comprising:
a top tube having a first end and a second end;
a down tube having a first end and a second end;
a head tube connected to the first end of the top tube and first end of the down tube;
a bottom bracket shell having an interior cavity for receiving a bottom bracket, the bottom bracket shell connected to the second end of the down tube and comprising:
carbon fiber;
at least one metal split ring positioned within and integrally formed with the carbon fiber; the at least one metal split ring having a discontinuous region with two ends which effectively face each other but do not connect; and
at least one groove wherein the at least one metal split ring is at least partially embedded into the at least one groove, such that an inner surface of the at least one metal split ring is substantially flush with an interior surface of the bottom bracket shell.

17. The bicycle assembly of claim 16, wherein the discontinuous region is positioned within a top $\frac{1}{3}$ of the bottom bracket shell.

18. The bicycle assembly of claim 16, wherein the at least one metal split ring comprises two metal split rings, each positioned within and integrally formed with the carbon fiber, the two metal split rings spaced from one another within the carbon fiber.

19. The bicycle assembly of claim 18, wherein the discontinuous regions of the two metal split rings are substantially aligned.

20. The bicycle assembly of claim 18, wherein each of the split metal rings is positioned within the interior cavity of the bottom bracket shell such that the gaps are located in a top region.

21. The bicycle assembly of claim 18, wherein the at least one groove comprises two grooves and one of the two metal split rings is at least partially embedded into one of the two grooves and the other of the two metal split rings is at least partially embedded into the other of the two grooves.

22. The bicycle assembly of claim 16, further comprising a bearing locating feature.

23. The bicycle assembly of claim 22, wherein the bearing locating feature comprises at least one of a cir-clip groove, a shoulder, a protrusion, a shelf, and a non-constant diameter of the bottom bracket shell.

* * * * *

UNITED STATES PATENT AND TRADEMARK OFFICE
CERTIFICATE OF CORRECTION

Page 1 of 1

PATENT NO.        : 8,882,125 B2
APPLICATION NO.   : 13/316399
DATED             : November 11, 2014
INVENTOR(S)       : Bradley L. Paquin It is certified that error appears in the above-identified patent and that said Letters Patent is hereby corrected as shown below:

In the Claims

In column 10 at line 6, In Claim 1, change "slit" to --split--.

In column 10 at line 29, In Claim 6, change "and the" to --and--.

Signed and Sealed this
Seventh Day of July, 2015

Michelle K. Lee
*Director of the United States Patent and Trademark Office*